United States Patent [19]

Inova

[11] Patent Number: 4,974,073
[45] Date of Patent: Nov. 27, 1990

[54] SEAMLESS VIDEO DISPLAY

[75] Inventor: Peter J. Inova, Los Angeles, Calif.

[73] Assignee: Metavision Inc., Burbank, Calif.

[21] Appl. No.: 143,870

[22] Filed: Jan. 14, 1988

[51] Int. Cl.⁵ .............................................. H04N 5/74
[52] U.S. Cl. ...................................... 358/87; 358/104; 358/231
[58] Field of Search ................. 358/87, 231, 104, 210, 358/211

[56] References Cited

U.S. PATENT DOCUMENTS

| | | | |
|---|---|---|---|
| 3,833,764 | 9/1974 | Taylor | 358/87 |
| 4,103,435 | 8/1978 | Herndon | 358/210 |
| 4,322,741 | 3/1982 | Kawabayashi | 358/56 |
| 4,345,817 | 8/1982 | Gwynn | 358/87 |
| 4,355,328 | 10/1982 | Kulik | 358/87 |
| 4,839,720 | 6/1989 | Isnardi | 358/141 |

Primary Examiner—Tommy P. Chin
Attorney, Agent, or Firm—Christie, Parker & Hale

[57] ABSTRACT

A seamless video display is generated from multiple discrete video images by overlapping the images and ramping the image brightness in the overlaps. The resulting composite image is of uniform brightness and has no seams between the images of which it is composed.

16 Claims, 5 Drawing Sheets

SEAMLESS VIDEO DISPLAY

FIELD OF THE INVENTION

The present invention pertains to the field of video image displays and more particularly to a method and apparatus for projecting a seamless video display from multiple video signals.

BACKGROUND OF THE INVENTION

Theater audiences continuously seek out larger displays with greater resolution. In the motion picture industry this has resulted in a gradual increase in the size of the film format from 16 mm to 35 mm to 70 mm to "IMAX". In the television industry, screens have increased in size so much that projection TVs can now fill an entire wall of an average sized living room.

However, while the larger film formats have brought high resolution, commercial television resolution is limited by the commercial industry broadcast standards. The broadcast standards define both the aspect ratio and the resolution of the image. The broadcast standards limit resolution by defining the number of horizontal lines per frame and the number of picture elements in each line. An increase in the size or horizontal scope of a commercial television image necessarily brings no increase in the number of lines or the number of picture elements in that image. Therefore, a very large picture will not be as sharp and clear as a smaller image. Several commercial-type video signals may be combined to form a single image with a different aspect ratio, with more picture elements, or with more lines per frame. However, this requires either combining several projectors to form that single image, or developing a whole new format different from the commercial standards.

In the film industry there have been several experiments with multiple projector systems. One such experiment was the "CINERAMA" systems of the 1950's. In "CINERAMA," three films, shown through three projectors, were combined to form a single panoramic image. Disneyland and its affiliate parks continue to use a different multiple projector system. At Disneyland, a circle of projectors shine onto a screen that circles the wall of a round room.

In the video field, multiple projector systems have been suggested for flight simulators, see e.g. U.S. Pat. No. 4,103,435 to Herndon, and U.S. Pat. No. 3,833,764 to Taylor. In addition, it is known to place several video screens next to each other to form a large image display from multiple projectors. However, the difficulty with all video based multiple projector display systems is making the multiple images appear to be one single continuous image on the display screen.

When two images are projected side by side on a single screen, there will normally be a seam between the two images. The final display image will either appear to be two images placed side by side with a gap in between or, if the images are made to overlap on a single screen, there will be a bright line where the two images overlap. Because of the inconsistencies in conventional cameras and projectors, it is exceedingly difficult to perfectly match video images with no gap and no overlap between the images. If the images are brought very close together on the same screen, there will likely be both gaps and overlaps at the seam.

SUMMARY OF THE INVENTION

The present invention is a method and apparatus for producing a seamless video display from multiple images. The invention comprises a method for producing a seamless image from at least two discrete images where each image overlaps with at least one other image by ramping the projected brightness of the overlapping portions of each image.

The invention also comprises an apparatus including at least two video signal generators where each generator produces a video signal that corresponds to a discrete image and each image overlaps at least one other image. The video signals are sent to at least two ramp generators. At least one ramp generator is coupled to each video signal generator. The ramp generators ramp the parts of the video signals that correspond to the overlaps between the images. At least one projector is coupled to each ramp generator. The images produced by the projectors corresponding to the ramped video signals, are projected onto a screen. A synchronizer is coupled to the video signal generators for synchronizing the images.

The present invention produces a seamless apparent image by overlapping the separate images and then ramping the brightness of the images at the seams between the separate images.

BRIEF DESCRIPTION OF THE DRAWINGS

FIG. 1 is a block diagram of a preferred embodiment of the present invention;

DETAILED DESCRIPTION OF THE INVENTION

An exemplary embodiment of the present invention is shown in FIG. Three video signal generators 10A, 10B, 10C operate in parallel. They generate video signals which correspond to discrete images as explained below. In the present embodiment, the signal generators are video disc players. Pioneer Model LDZ 6000A is suitable. Each video disc player transmits a unique frame number for each discrete image to a synchronizer 8. The synchronizer compares the frame numbers received from the video disc players and then regulates the video disc players so they produce like numbered images at the same time. In this way, the synchronizer maintains synchronous parallel operation for the whole system. An APh Model VDU-1 is a suitable synchronizer. The video signal generators each transmit their video signals, in parallel, to the corresponding one of three ramp generators 12A, 12B, 12C. The ramp generators ramp the signal as will be described in more detail below. Commercially available special effects generators, such as the Vidicraft Model SEG-200, may be used for ramp generators.

Each of the ramp generators sends the ramped signal to the corresponding one of three video image projectors 14A, 14B, 14C. Commercially available projectors such as the Panasonic Model PT-101N are suitable. In the present embodiment, the projectors convert the electrical signals to light beams. The three beams are projected onto a single screen 16, in parallel.

The screen displays three discrete images 18A, 18B, 18C which correspond to the three ramped video signals. Where the images come together there are overlaps 20A, 20B. The left overlap 20A occurs where the left image 18A and the center image 18B are both projected onto the same part of the screen. The right overlap 20B occurs where the center image 18B and the right image 18C are both projected onto the same part of the screen.

The information in the video signals corresponding to the overlaps 20A, 20B is duplicated in the video signals for the three images 18A, 18B, 18C. That is, for the left overlap 20A, the right portion of the left image 18A that is projected onto the left overlap 20A, must be virtually identical to the left portion of the center image 18B that is projected onto the left overlap 20A. Otherwise, neither of the overlapping portions of the two images 18A, 18B will appear clearly on the screen. The same thing applies for the right overlap 20B.

Because the images are duplicated within the overlaps and because the video signals are ramped, the three images displayed on the screen appear to be one continuous, seamless image almost three times as wide as a normal video image but with the same clarity and sharpness as a normal video image. This composite larger image which appears on the screen will be referred to as the apparent image.

Figure 1A:
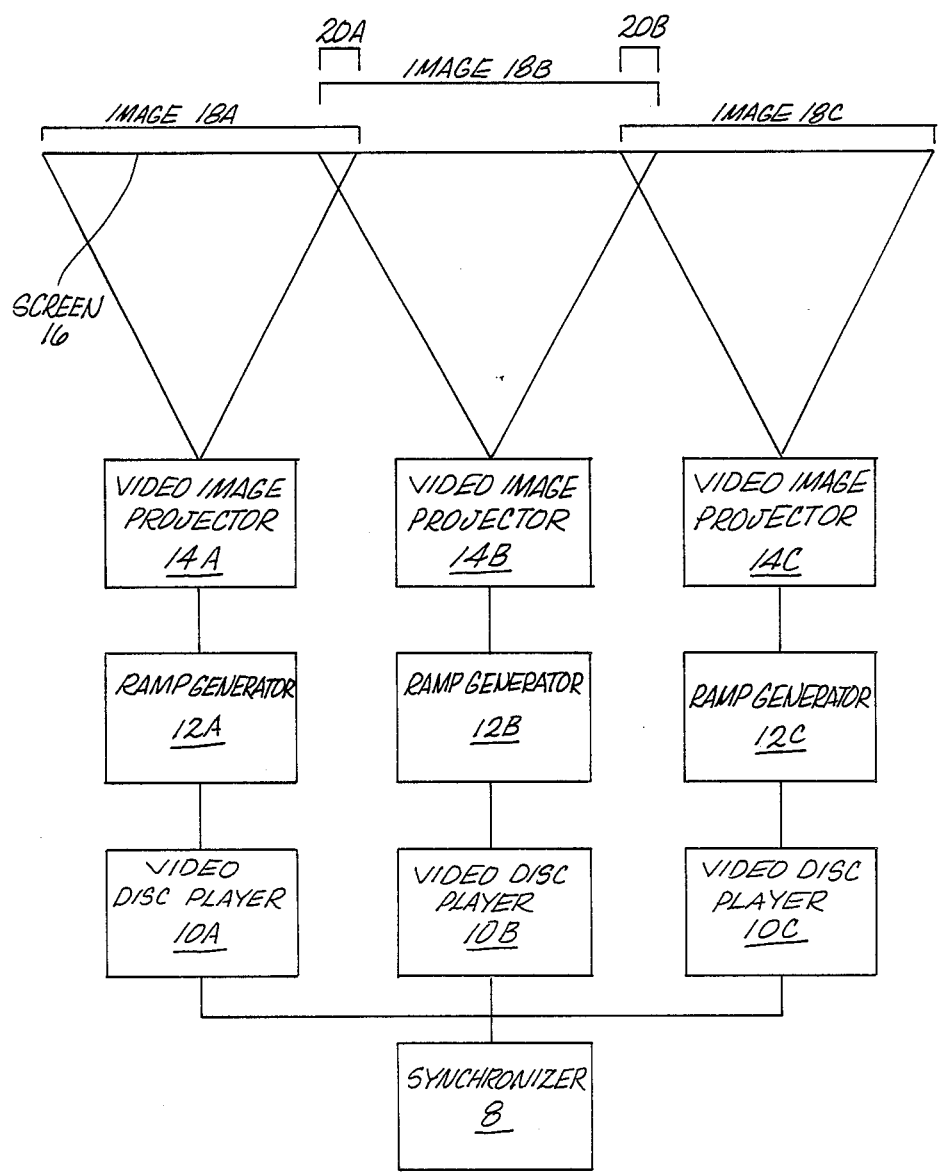
FIG. 1A is a block diagram of one embodiment of the invention of FIG. 1.
Figure 1B:
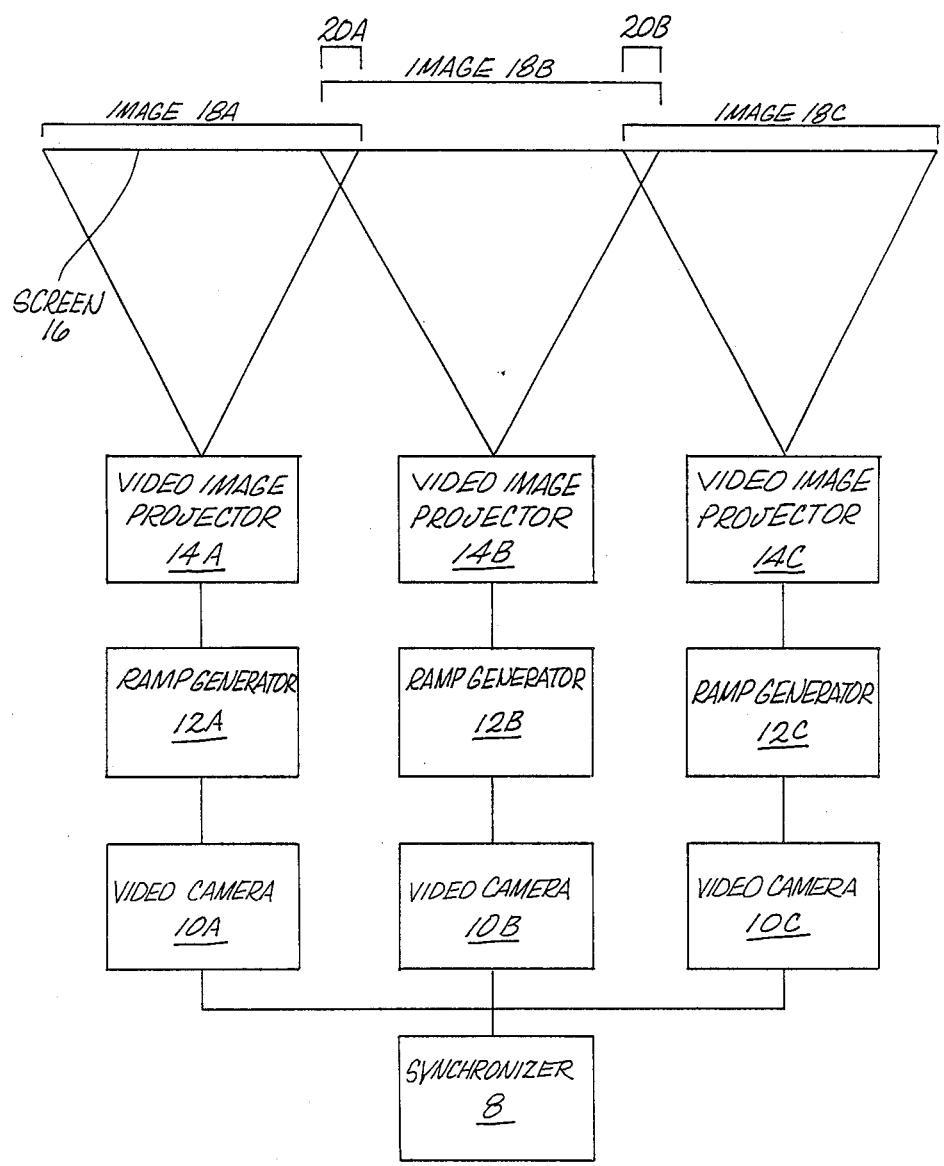
FIG. 1B is a block diagram of a second embodiment of the invention of FIG. 1.
Figure 2:
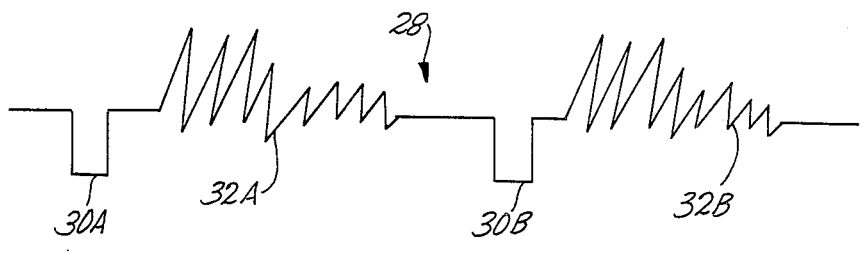
FIG. 2 is a graphical illustration of a video signal.

The nature of the video signal emitted by the video signal generators is illustrated in FIG. 2. The video signal 28 has a sequence of horizontal synchronization signals 30A, 30B each followed by amplitude signals 32A, 32B. The video signal includes other components as well, but they are not important to this discussion and are not shown in FIG. 2. Each synchronization and amplitude signal pair, e.g. 30A and 32A corresponds to a single scan line traced across the screen. The synchronization signal indicates the start of each scan line. The amplitude signal indicates the brightness of the projector beam as the line is traced.

In operation, the projector begins to trace a scan line when it receives a synchronization signal. For conventional direct viewing cathode ray tube and for projection televisions, this means that a beam of electrons from an electron gun is aimed at the top left corner of a phosphorous screen. The electron beam is then deflected to the right across the top of the screen. The number of electrons emitted by the gun is regulated by the amplitude signal. When a new synchronization signal is received the electron beam moves back to the left of the screen and traces a second scan line immediately below the first. This is repeated with each synchronization signal and each amplitude signal, until the electron beam reaches the bottom right hand corner of the screen. The beam has then drawn one complete image and, upon receiving a vertical synchronization signal, returns to the top left of the screen to draw the next image. The lines are drawn so quickly that there appears to be a single moving image rather than a series of line tracings. The number of lines and picture elements per image as well as a host of other details are determined by the standards for the particular format and are intrinsic to the video signal.

Figure 3:
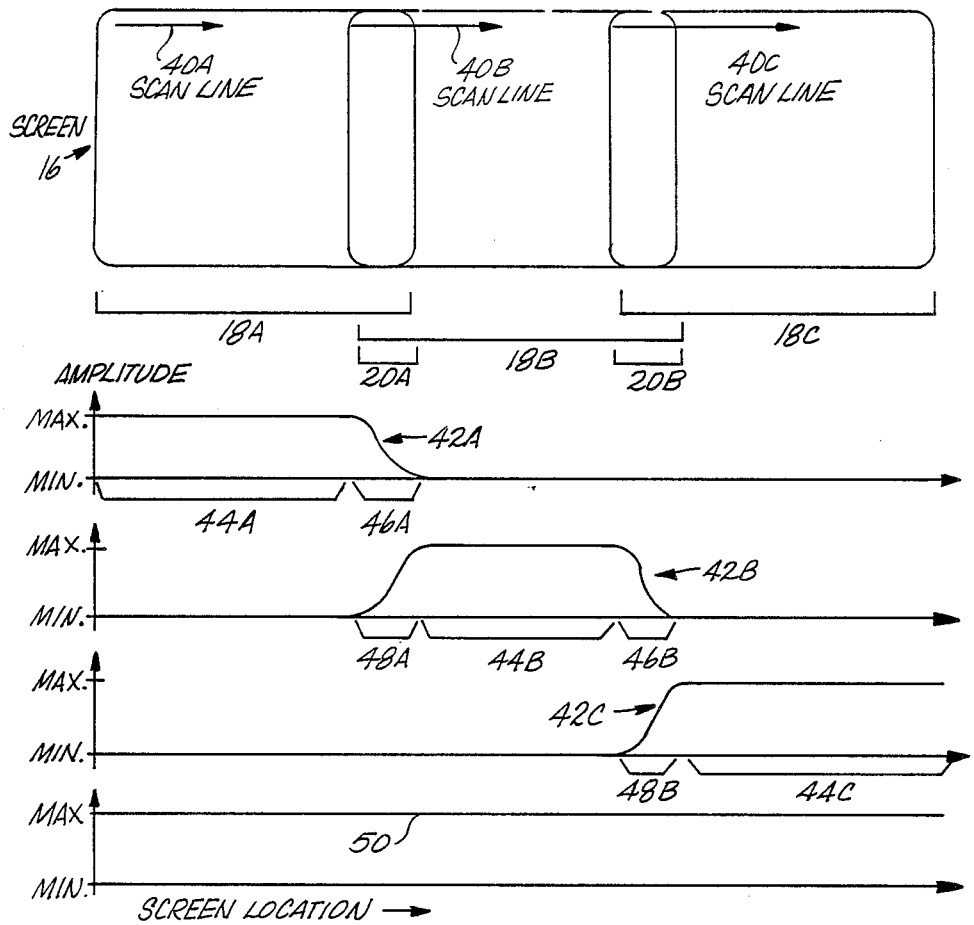
FIG. 3 is a diagram of a screen incorporating the present invention and its corresponding ramp functions.

FIG. 3 demonstrates how video signals are ramped according to the present invention. In the exemplary embodiment, the three parallel systems, each consisting of a video signal generator, a ramp generator and a video image projector are synchronized. For each image therefore all three projectors 14A, 14B, 14C begin to project a trace of their respective first scan lines 40A, 40B, 40C at the same time on different parts of the same screen 16. Because of the speed at which the lines are traced, this produces the appearance of a continuous line across the screen. When all the lines for the three images have been traced, it appears as if a continuous image almost three times the width of a standard image has been projected onto the screen.

However, the overlaps 20A, 20B will be traced twice. For the left overlap 20A the top line of the image will be traced first by the center scan line 40B at the beginning of its travel and then by the left scan line 40A at the end of its travel. A similar thing happens at the right overlap 20B. Without ramping, the apparent image would be substantially brighter in the overlaps than in the rest of the screen. The double tracing creates two bright seams between the three images. The bright seams can be eliminated by moving the projectors 14A, 14B, 14C apart to eliminate the overlaps 20A, 20B. However, it is virtually impossible to perfectly match the images and there will either be thin bright seam overlaps or thin dark line gaps between the three images or both.

In the present embodiment, the invention eliminates the seam by applying a ramp function 42A 42B, 42C, depicted in FIG. 3, to the amplitude signal 32. This is done in the ramp generator 12 before the video signal is transmitted to the projector 14. The synchronization signals 30 are undisturbed. The first ramp function 42A is applied by the left ramp generator 12A to the amplitude signal generated by the left video signal generator 10A. The second ramp function 42B is applied by the center ramp generator 12B to the signal from the center signal generator 10B, and the third ramp function 42C is applied by the right ramp generator 12C to the signal from the right signal generator 10C.

The ramp functions 42 affect the amplitude signals only at the image seams. Each ramp function includes a flat portion 44A, 44B, 44C which does not affect the video signal, and one or two ramped portions 46A, 46B, 48A, 48B. The ramped portions are smooth curves which do affect the video signal. The negative slope curves 46A, 46B smoothly reduce the amplitude signal from full strength to near zero strength. The positive slope curves 48A and 48B smoothly increase the amplitude signal from near zero strength to full strength. The curves are smooth because sudden transitions may show up as apparent lines, image details, or visual artifacts on the screen. However, in another embodiment, it may be desirable to use square functions or other differently shaped ramp functions instead of the smooth curves depicted in FIG. 3.

The curves complement each other in that where a negatively and a positively sloped curve, e.g., 46A and 48A, affect the apparent image at the same overlap, e.g., 20A, the combination of the two curves across the overlap is equivalent to the flat portion of the ramp functions 44. In FIG. 3, the illustrations of the ramp functions 42 are aligned with the corresponding portions of the screen 16. Combining the three ramp functions 42 together provides a flat line 50 equal in amplitude to the flat portion 44 of the ramp functions. Uniform image brightness is thereby maintained across the entire screen 16. If square or otherwise shaped ramp functions are used, the ramp functions must still be complementary in order to maintain uniform brightness.

In operation, the first projected scan line 40A for the left image 18A is at first unaffected by the ramp function 42A. The flat portion of the ramp function 44A has no effect on the amplitude signal. When the trace reaches the left edge of the left overlap 20A, the ramp function 42A starts to smoothly reduce the amplitude of the amplitude signal. By the time the line is traced to the right edge of the left image 18A, the amplitude signal is reduced to approximately zero. As a result, the brightness of the first line on the screen begins to fall off at the left edge of the center screen until it reaches zero at the right edge of the left screen. The same ramp function is applied to each successive amplitude signal affecting each successive line the same way. The left image 18A accordingly darkens gradually at its right edge.

The second ramp function 42B is applied to the center image 18B. The second ramp function ramps the right edge of the center image in the same way that the first ramp function 42A ramps the right edge of the left image 18A. However, the second ramp function also ramps the left edge of the center image. Therefore, when the first scan line for the center image 40B is begun at the top left corner of the center image 18B, the line has near zero brightness. The brightness of the line increases smoothly as it is traced to the left. At the right edge of the left image 18A the line is at full brightness. It stays at full brightness until it reaches the left edge of the right image 18C where it is ramped back down to near zero in the same way that the left image line 42A is ramped. The ramp function is added to every line that makes up the center image 18B so that the center image is ramped at both ends.

The right image 18C is ramped at its left edge in the same way that the center image 18B is ramped at its left edge. The right edge of the right image is unaffected by the ramping function, just as the left edge of the left image 18A is unaffected.

When all three images are projected onto a single screen the portions of each image that lie in the overlaps combine. Therefore, the brightness level across the whole screen remains uniform and the apparent image appears to be seamless.

In the present embodiment, the video projectors are conventional devices using standard formats. As a result, conventional cameras, editors, processors and players may be used to create and process the parallel images. The video signal generators may be tape players, television receivers, cameras or any other source of video signals. In addition material prerecorded in conventional video formats can be easily integrated into a display which exploits the benefits of the present invention.

While the present embodiment uses three parallel projectors coupled to three signal generators, any plural number of parallel systems may be used. A still wider apparent image may be obtained by using four or more parallel projection systems in a row.

A tall apparent image may be produced by stacking images vertically. Vertically stacked images are ramped at the top and bottom edges corresponding to the horizontal overlaps. The brightness of each scan line is consistent throughout the line, but the brightness of consecutive scan lines is varied. For the top image, the bottom scan lines are successively ramped to near zero at the overlap. For the bottom image, the top scan line is at near zero brightness and successive lines are brighter until full brightness is reached at the end of the overlap. Intermediate images are ramped both at the top and the bottom. Vertical and horizontal stacking may be combined to obtain an apparent image with any desired aspect ratio and size.

The present invention may also be implemented using specially dedicated equipment. For example, instead of using three video disc players, a specially constructed disc or tape and player system capable of producing three or any other plural number of discrete video signals or a single camera capable of producing multiple discrete video signals, may be used. Instead of using three projections that cast light on a single wide screen, the projectors may comprise independent electron beams within a cathode ray tube that sweep across neighboring overlapping portions of a single phosphor coated screen.

Instead of using separate special effects generators as ramp generators, the ramp generators may be incorporated into the projectors or into the video signal generators. The ramping may also be performed between the projector and the screen with a filter placed between the projector's light or electron beam and the screen.

Figure 4:
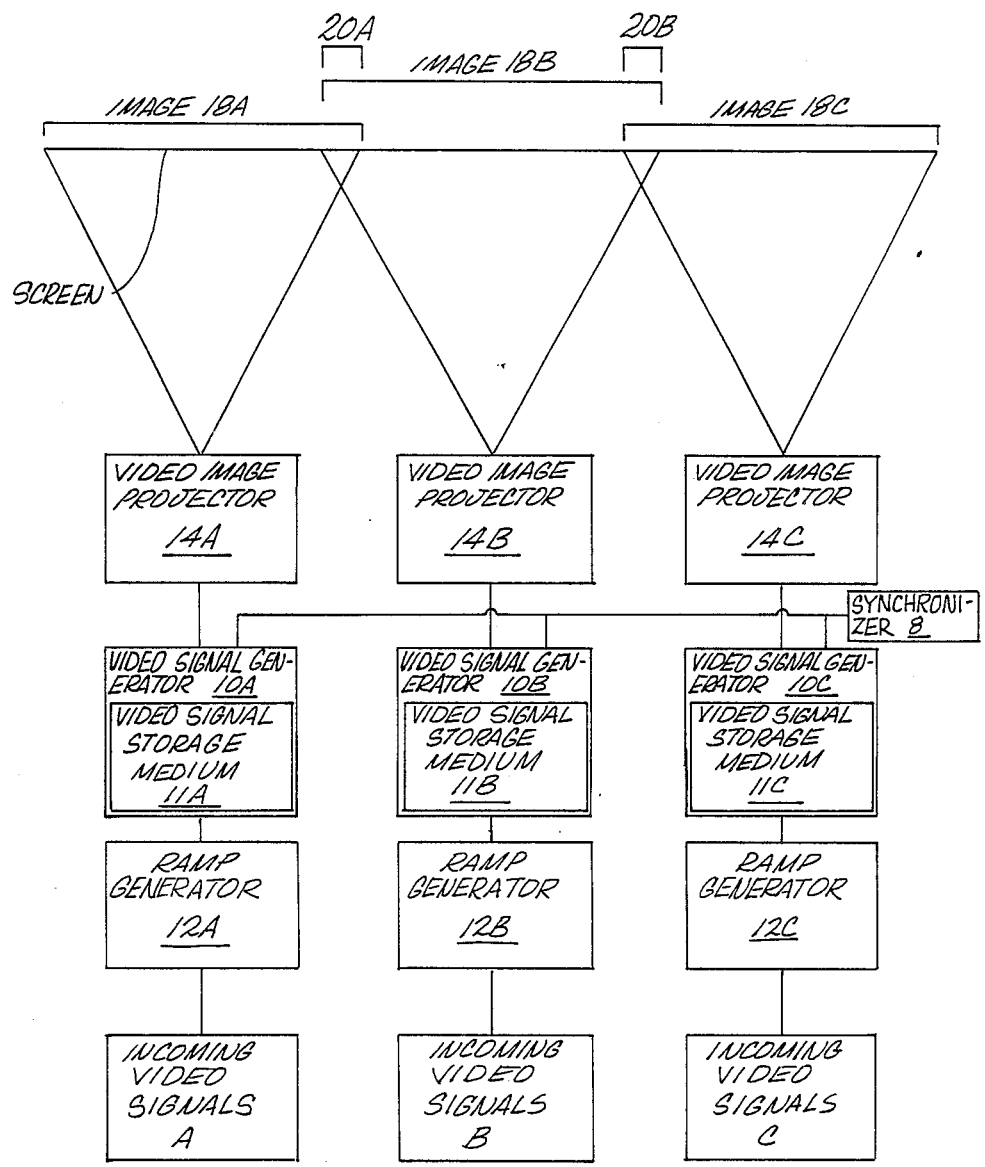
FIG. 4 is a block diagram of an alternate embodiment of the present invention in which the video signals are ramped before being stored in the video signal generators.

As shown in FIG. 4 the signal generator is reading a stored signal, the ramping may also be applied to the signals before they are stored. FIG. 4 shows a video signal storage medium 11A, 11B, 11C as an internal component of each of the three video signal generators 10A, 10B, 10C. The ramping in FIG. 4 is a part of the video signals which are stored in each storage medium. The ramping is then incorporated into the output of the signal generators which feed directly into the projectors. Other modifications and adaptations of the present invention may also be made without departing from the spirit and scope of the present invention.

What is claimed is:

1. A method for producing a seamless apparent image from at least two discrete video signals, the video signals corresponding to discrete images, the discrete images such being projected separately onto a screen, each with a particular brightness and at least one of the discrete images having at least one overlap with at least one other of the discrete images, the method comprising ramping the brightness of the discrete images in at least one of the overlaps to reduce the appearance of a seam in the overlap between the corresponding images.

2. A method for producing a seamless apparent image from multiple projectors comprising:
    (a) generating at least two discrete video signals, the signals corresponding to discrete video images, at least one video image having an overlap with at least one other of the video images;
    (b) ramping the portion of the video signals corresponding to the brightness of the image overlaps to reduce the appearance of a seam in the overlaps between the images; and
    (c) separately projecting the images corresponding to the ramped video signals onto a screen.

3. The method of claim 2 comprising the additional step of storing the video signals in a storage medium after ramping and before projecting.

4. A seamless display for multiple video images comprising:

(a) a source of multiple ramped video signals, the signals corresponding to discrete images, at least one image having an overlap with at least one other image, and the signals corresponding to the brightness of the overlapping images being ramped in the portions of the signals corresponding to the overlap to reduce any appearance of a seam in the overlap between the corresponding images; and (b) multiple projectors for producing the discrete images corresponding to the ramped video signals, coupled to the source of multiple ramped video signals.

5. The display of claim 4 also comprising a screen for exhibiting the images produced by the projectors.

6. The display of claim 5 also comprising a synchronizer for synchronizing the video signals produced by the video signal generators.

7. The display of claim 4 wherein the source of multiple ramped video signals comprises at least one video disc player.

8. The display of claim 4 wherein the source of multiple ramped video signals comprises at least one video camera.

9. The display of claim 4 wherein the source of multiple ramped video signals comprises:

(a) at least two video signal generators, each generator producing at least one video signal; and (b) at least two ramp generators, for ramping the video signals, there being at least one ramp generator coupled to each video signal generator.

10. A seamless display for multiple video images comprising:

(a) at least two discrete video signal sources each for producing a respective discrete video signal;

(b) at least two discrete projectors each for receiving one of the at least two discrete video signals and projecting an image corresponding to the received video signal, the projectors projecting the images so that a portion of each image overlaps with a portion of another image; and (c) a ramp generator for ramping the brightness of each image in each portion which overlaps with a portion of another image.

11. The display of claim 10 further comprising a screen and wherein the projectors project the images onto the screen.

12. The display of claim 10 wherein the ramp generator ramps the portion of each discrete video signal corresponding to the brightness of the portion of each image which overlaps with a portion of another image.

13. The display of claim 12 wherein the ramp generator receives the discrete video signals from the video signal sources, ramps them, and transmits them to the respective discrete projector.

14. The display of claim 12 wherein the ramp generator comprises at least two discrete generators, each generator receiving a discrete video signal from a respective one of the at least two discrete video signal sources, ramping the respective video signal and transmitting the signal to a respective one of the at least two projectors.

15. The display of claim 10 wherein the video signal sources comprise video disc players.

16. The display of claim 10 comprising a synchronizer for synchronizing the video signals produced by the video signal generators.

* * * * *